United States Patent
Kobayashi et al.

(10) Patent No.: US 10,077,835 B2
(45) Date of Patent: Sep. 18, 2018

(54) VEHICLE AND CONTROL METHOD OF VEHICLE

(71) Applicant: TOYOTA JIDOSHA KABUSHIKI KAISHA, Toyota-shi, Aichi-ken (JP)

(72) Inventors: Nobufusa Kobayashi, Anjo (JP); Masato Yoshikawa, Toyota (JP); Takaaki Tanaka, Toyota (JP); Masato Shimoda, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/487,828

(22) Filed: Apr. 14, 2017

(65) Prior Publication Data
US 2017/0299053 A1    Oct. 19, 2017

(30) Foreign Application Priority Data
Apr. 19, 2016 (JP) ................. 2016-084067

(51) Int. Cl.
| F16H 61/02 | (2006.01) |
| F16H 3/72 | (2006.01) |
| F16H 37/08 | (2006.01) |
| F16H 61/00 | (2006.01) |
| F16H 59/18 | (2006.01) |
| F16H 59/40 | (2006.01) |
| F16H 59/24 | (2006.01) |
(Continued)

(52) U.S. Cl.
CPC ......... *F16H 61/0213* (2013.01); *F16H 3/728* (2013.01); *F16H 37/08* (2013.01); *F16H 61/0021* (2013.01); *F16H 59/18* (2013.01); *F16H 59/24* (2013.01); *F16H 59/40* (2013.01); *F16H 59/42* (2013.01); *F16H 63/50* (2013.01); *F16H 2059/366* (2013.01); *F16H 2061/0216* (2013.01)

(58) Field of Classification Search
None
See application file for complete search history.

(56) References Cited

U.S. PATENT DOCUMENTS

| 2005/0103544 A1 | 5/2005 | Takami et al. |
| 2013/0184920 A1 | 7/2013 | Otsubo et al. |
(Continued)

FOREIGN PATENT DOCUMENTS

| EP | 2754597 A1 | 7/2014 |
| JP | 2006-009942 A | 1/2006 |
(Continued)

OTHER PUBLICATIONS

U.S. Appl. No. 15/800,381, filed Nov. 1, 2017 in the name of Nobufusa Kobayashi et al.

*Primary Examiner* — Justin Holmes
(74) *Attorney, Agent, or Firm* — Oliff PLC

(57) ABSTRACT

In a vehicle including an engine, drive wheels, a power transmission system, and an electronic control unit, during shifting of an automatic transmission, a hydraulic command value of a clutch is set to a higher value as an engine power command value is larger, so that a shift or change of the speed ratio proceeds in an electronic continuously variable transmission and the automatic transmission, in accordance with engine power as a product of the engine speed and engine torque, rather than torque of the engine, etc.

8 Claims, 5 Drawing Sheets

(51) Int. Cl.
    *F16H 59/42*     (2006.01)
    *F16H 63/50*     (2006.01)
    *F16H 59/36*     (2006.01)

(56) References Cited

U.S. PATENT DOCUMENTS

| | | | | |
|---|---|---|---|---|
| 2014/0243150 A1* | 8/2014 | Choi | B60W 10/02 | 477/79 |
| 2014/0287869 A1* | 9/2014 | Kato | B60W 10/02 | 477/3 |
| 2014/0343775 A1 | 11/2014 | Yamamoto et al. | | |
| 2015/0246670 A1* | 9/2015 | Ideshio | B60K 6/48 | 477/5 |
| 2015/0246671 A1* | 9/2015 | Imamura | B60K 6/445 | 701/22 |
| 2015/0336571 A1* | 11/2015 | Kuwahara | B60W 10/06 | 701/22 |

FOREIGN PATENT DOCUMENTS

| | | |
|---|---|---|
| JP | 2007-092665 A | 4/2007 |
| JP | 2010-188794 A | 9/2010 |
| JP | 2014-184804 A | 10/2014 |
| JP | 2014-223888 A | 12/2014 |

\* cited by examiner

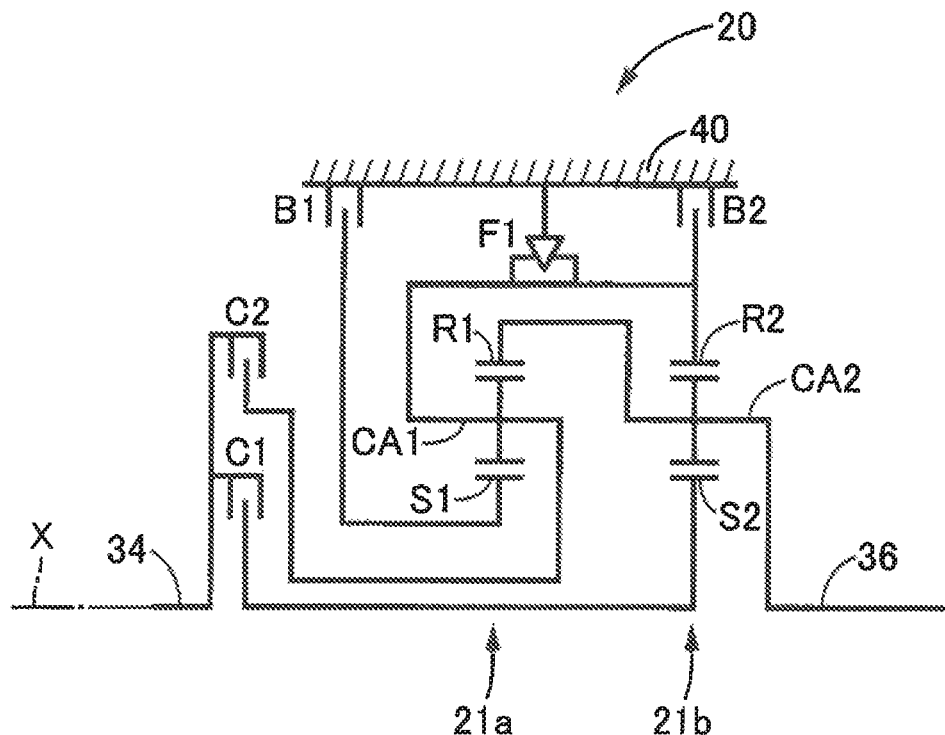

VEHICLE AND CONTROL METHOD OF VEHICLE

INCORPORATION BY REFERENCE

The disclosure of Japanese Patent Application No. 2016-084067 filed on Apr. 19, 2016 including the specification, drawings and abstract is incorporated herein by reference in its entirety.

BACKGROUND

1. Technical Field

The disclosure relates to a vehicle and a control method of the vehicle. The vehicle includes a continuously variable transmission and a stepwise variable transmission that are arranged in series.

2. Description of Related Art

A vehicular drive system including an engine, a continuously variable transmission, and a stepwise variable transmission is disclosed in Japanese Patent Application Publication No. 2006-9942 (JP 2006-9942 A). The continuously variable transmission transmits power of the engine toward drive wheels. The stepwise variable transmission provides a part of a power transmission path between the continuously variable transmission and the drive wheels, and a shift of the stepwise variable transmission is performed through engagement/release of hydraulic engagement devices. The vehicular drive system of JP 2006-9942 A includes an electric continuously variable transmission, first motor, second motor, and the stepwise variable transmission. In the electric continuously variable transmission, the operating state of the first motor is controlled, so that a differential state of a differential mechanism is controlled. The second motor is coupled to an output rotating member of the electric continuously variable transmission. The stepwise variable transmission provides a part of the power transmission path between the electric continuously variable speed change part and the drive wheels. The stepwise variable transmission is of a planetary gear type. A control system of the vehicular drive system calculates reaction-force torque of the first motor, and output torque of the second motor, based on a current value of the first motor and a current value of the second motor, and estimates input torque of the stepwise variable transmission, based on each torque thus calculated. The reaction-force torque of the first motor is mechanically transmitted from the engine to the input side of the stepwise variable transmission via the differential mechanism. The control system controls transient hydraulic pressures of the engagement devices associated with a shift of the stepwise variable transmission, based on the estimated input torque.

SUMMARY

In a vehicular power transmission system including a continuously variable transmission and a stepwise variable transmission arranged in series, the engine speed can be controlled, separately from or independently of control of the input rotational speed of the stepwise variable transmission. Therefore, the input rotational speed of the stepwise variable transmission can be controlled by controlling the hydraulic pressures of the engagement devices based on the input torque of the stepwise variable transmission during shifting of the stepwise variable transmission. Meanwhile, when the engine speed is controlled at the same time during shifting of the stepwise variable transmission, the control will be complicated. In this connection, the rate of change of the engine speed is considered to have a large contribution to the driveability. Thus, even when the shift control of the stepwise variable transmission itself is performed as expected by taking account of the input torque of the stepwise variable transmission, during shifting of the stepwise variable transmission, the control of the engine speed may not be performed as expected. Namely, the engine speed may not be changed in a target manner. As a result, the rate of change of the engine speed may be delayed or advanced relative to the degree of shift progression of the stepwise variable transmission (e.g., the rate of change of the rotational speed of the input rotating member of the stepwise variable transmission). Consequently, the driver may feel strange or uncomfortable.

The disclosure provides a vehicle and a control method of the vehicle. The vehicle has a power transmission system including a continuously variable transmission and a stepwise variable transmission arranged in series, which is able to reduce deterioration of the drivability due to a gap between the rate of change of the engine speed and the degree of shift progression of the stepwise variable transmission.

A first aspect of the disclosure is a vehicle. The vehicle includes an engine, drive wheels, a power transmission system, and an electronic control unit. The power transmission system includes a continuously variable transmission and a stepwise variable transmission. The continuously variable transmission is configured to transmit power of the engine toward the drive wheels. The stepwise variable transmission provides a part of a power transmission path between the continuously variable transmission and the drive wheels. The stepwise variable transmission includes a hydraulic engagement device. A shift of the stepwise variable transmission is performed through operation of the engagement device. The electronic control unit is configured to set a hydraulic command value of the engagement device to a higher value as a power command value of the engine is larger, during shifting of the stepwise variable transmission.

In the vehicle as described above, the electronic control unit may be configured to set the hydraulic command value of the engagement device, based on a first power required for shift progression in the continuously variable transmission and the stepwise variable transmission, during shifting of the stepwise variable transmission. The electronic control unit may be configured to set the hydraulic command value of the engagement device to a higher value as the first power is smaller.

In the vehicle as described above, the electronic control unit may be configured to calculate the first power required for the shift progression, by dividing a rotational energy difference in the continuously variable transmission and the stepwise variable transmission, before and after the shift of the stepwise variable transmission, by a target shift time of the stepwise variable transmission.

In the vehicle as described above, the electronic control unit may be configured to set the first power to a larger value as a rotational speed of an output rotating member of the stepwise variable transmission is higher. The electronic control unit may be configured to set the first power to a larger value as a difference between gear ratios of gear positions of the stepwise variable transmission before and after the shift of the stepwise variable transmission is larger.

In the vehicle as described above, the electronic control unit may be configured to set the hydraulic command value of the engagement device, based on a second power calculated by subtracting the first power from a power command value of the engine. The electronic control unit may be configured to set the hydraulic command value of the engagement device to a higher value as the second power is larger.

In the vehicle as described above, the continuously variable transmission may include a differential mechanism and a first motor. The differential mechanism may be coupled to the engine such that power is transmitted between the engine and the differential mechanism. The first motor may be coupled to the differential mechanism such that power is transmitted between the differential mechanism and the first motor. The continuously variable transmission may be an electric continuously variable transmission in which a differential state of the differential mechanism is controlled by controlling an operating state of the first motor. The power transmission system may further include a second motor coupled to an output rotating member of the electric continuously variable transmission such that power is transmitted between the second motor and the output rotating member.

In the vehicle as described above, the power transmission system may further include a power storage device that supplies and receives electric power to and from each of the first motor and the second motor. The electronic control unit may be configured to set the hydraulic command value of the engagement device without taking account of charge and discharge power of the power storage device.

A second aspect of the disclosure provides a control method of a vehicle. The vehicle includes an engine, drive wheels, a power transmission system and an electronic control unit. The power transmission system includes a continuously variable transmission and a stepwise variable transmission. The continuously variable transmission is configured to transmit power of the engine toward the drive wheels. The stepwise variable transmission provides a part of a power transmission path between the continuously variable transmission and the drive wheels. The stepwise variable transmission includes a hydraulic engagement device. A shift of the stepwise variable transmission is performed through operation of the engagement device. The control method includes setting, by the electronic control unit, a hydraulic command value of the engagement device to a higher value as a power command value of the engine is larger, during shifting of the stepwise variable transmission.

With the above arrangement, during shifting of the stepwise variable transmission, the hydraulic command value of the engagement device is set to a higher value as the power command value of the engine is larger. Therefore, the shift proceeds in accordance with the power of the engine as the product of the engine speed and the engine torque, rather than torque of the engine, etc. Accordingly, in the vehicular power transmission system including the continuously variable transmission and the stepwise variable transmission arranged in series, the controllability during shifting of the stepwise variable transmission is improved, and deterioration of the driveability due to a gap between the rate of change of the engine speed and the degree of shift progression of the stepwise variable transmission can be reduced.

With the above arrangement, during shifting of the stepwise variable transmission, the hydraulic command value of the engagement device is set based on the power required for shift progression in the continuously variable transmission and the stepwise variable transmission, and the hydraulic command value of the engagement device is set to a higher value as the power required for the shift progression is smaller. Therefore, the hydraulic command value of the engagement device is appropriately set according to the power required for shift progression (namely, power required when the input rotational member of the stepwise variable transmission, the engine, etc. change the rotational speeds during shifting). Accordingly deterioration of the driveability due to a gap between the rate of change of the engine speed and the degree of shift progression of the stepwise variable transmission can be reduced.

With the above arrangement, the power required for the shift progression is calculated by dividing a rotational energy difference in the continuously variable transmission and the stepwise variable transmission, before and after the shift of the stepwise variable transmission, by the target shift time of the stepwise variable transmission. Therefore, the hydraulic command value of the engagement device can be appropriately set based on the power required for shift progression.

With the above arrangement, the power required for the shift progression is set to a larger value as the rotational speed of the output rotating member of the stepwise variable transmission is larger, and is set to a larger value as a difference between the gear ratios of the gear positions established before and after the shift of the stepwise variable transmission. Therefore, the hydraulic command value of the engagement device can be appropriately set based on the power required for the shift progression.

With the above arrangement, the hydraulic command value of the engagement device is set based on the power calculated by subtracting the power required for the shift progression from the power command value of the engine, and the hydraulic command value of the engagement device is set to a higher value as the calculated power is larger. Therefore, the hydraulic command value of the engagement device is appropriately set according to the power required for shift progression (namely, the power required when the input rotational member of the stepwise variable transmission and the engine, etc. change the rotational speeds during shifting). Accordingly, deterioration of the driveability due to a gap between the rate of change of the engine speed and the degree of shift progression of the stepwise variable transmission can be reduced.

With the above arrangement, the continuously variable transmission is an electric continuously variable transmission, and the vehicular power transmission system further includes a second motor that is coupled to an output rotating member of the electric continuously variable transmission such that power can be transmitted between the second motor and the output rotating member. Accordingly, in the vehicular power transmission system in which the electric continuously variable transmission and the stepwise variable transmission arranged in series, the controllability during shifting of the stepwise variable transmission is improved, and deterioration of the driveability due to a gap between the rate of change of the engine sped and the degree of shift progression of the stepwise variable transmission can be reduced.

With the above arrangement, the hydraulic command value of the engagement device is set without taking account of charge/discharge power of the power storage device that supplies and receives electric power to and from each of the first motor and the second motor. Therefore, the shift can be realized in a condition where the power storage device is not charged nor discharges power (namely, a condition where the electric power balance of the power storage device is equal to zero), and the shift control can be realized with high reproducibility, regardless of restrictions of charge/discharge power of the power storage device imposed by the temperature, charging capacity, etc. of the power storage device. Namely, the shift control can be realized with high reproducibility, by deliberately excluding the concept of charge/discharge power of the power storage device, when the hydraulic command value of the engagement device is set.

BRIEF DESCRIPTION OF THE DRAWINGS

Features, advantages, and technical and industrial significance of exemplary embodiments will be described below with reference to the accompanying drawings, in which like numerals denote like elements, and wherein:

FIG. 3 is skeleton diagram illustrating one example of an automatic transmission;

FIG. 4 is an operation table explaining the relationship between shift operation of the automatic transmission shown in FIG. 3, and a combination of operating states of engagement devices used in the shift operation;

DETAILED DESCRIPTION OF EMBODIMENTS

Some embodiments will be described in detail with reference to the drawings.

Figure 1:
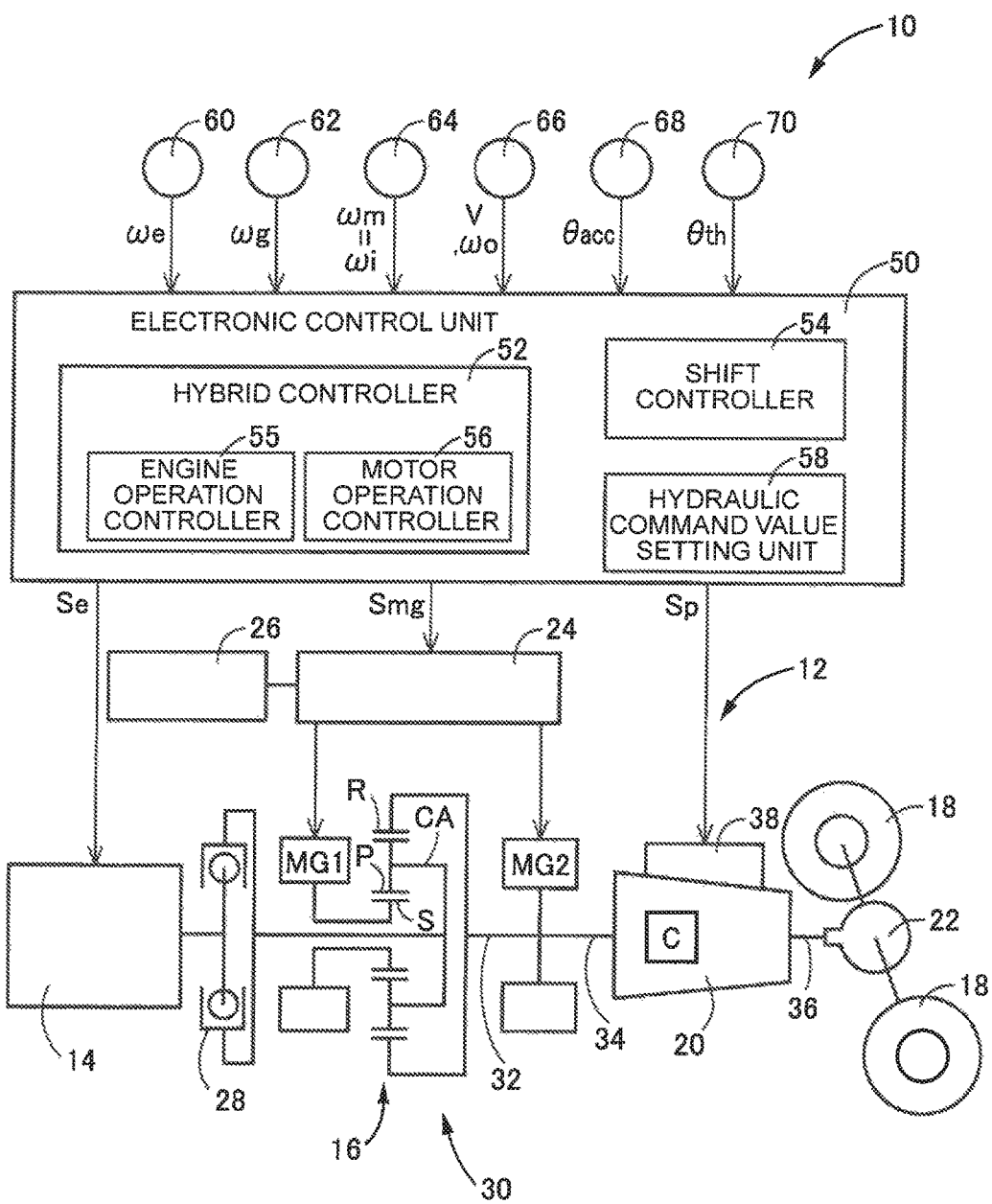
FIG. 1 is a view schematically showing the configuration of a power transmission system included in a vehicle according to one embodiment, and is also a view useful for explaining control functions and a principal part of a control system for various controls performed in the vehicle.

FIG. 1 schematically shows the configuration of a power transmission system 12 provided in a vehicle 10 to which this disclosure is applied, and is also useful for explaining a principal part of a control system for various controls performed in the vehicle 10. In FIG. 1, the vehicle 10 is a hybrid vehicle including an engine 14, a first motor MG1, and a second motor MG2. The power transmission system 12 includes a power distribution mechanism 16, and an automatic transmission (AT) 20. The power distribution mechanism 16 is a differential mechanism having a plurality of rotating elements (rotating members). The engine 14, first motor MG1, and the second motor MG2 are respectively coupled to the rotating elements such that power can be transmitted between the engine 14, first motor MG1, and second motor MG2, and the corresponding rotating elements. The automatic transmission (AT) 20 is disposed between the power distribution mechanism 16 and drive wheels 18. In the power transmission system 12, power (which is synonymous with torque or force where they are not particularly distinguished from each other) generated from the engine 14 and the second motor MG2 is transmitted to the automatic transmission 20, and then transmitted from the automatic transmission 20 to the drive wheels 18 via a differential gear unit 22, etc.

The engine 14 is a main power source of the vehicle 10, and is an internal combustion engine, such as a gasoline engine or a diesel engine. Operating conditions, such as the throttle opening θth or intake air amount, fuel supply amount, and ignition timing, of the engine 14 are controlled by an electronic control unit 50 which will be described later, and engine torque Te is controlled.

The first motor MG1 and the second motor MG2 have a function as a motor and a function as a generator. Namely, the first motor MG1 and the second motor MG2 are motor-generators that are selectively operated as a motor or a generator. Each of the first motor MG1 and the second motor MG2 is connected to a battery 26 included in the power transmission system 12, via an inverter 24 included in the power transmission system 12. With the inverter 24 controlled by the electronic control unit 50 that will be described later, MG1 torque Tg and MG2 torque Tm as output torque (or regenerative torque) of each of the first motor MG1 and the second motor MG2 are controlled. The battery 26 is a power storage device that supplies and receives electric power to and from each of the first motor MG1 and the second motor MG2.

The power distribution mechanism 16 is a single-pinion-type planetary gear unit having three rotating elements, i.e., a sun gear S, a ring gear R, and a carrier CA that supports pinion gears P, such that the pinion gears P can rotate about themselves and rotate about the axis of the gear unit. The ring gear R is disposed concentrically with respect to the sun gear S. The pinion gears P are located so as to mesh with the sun gear S and the ring gear R. The power distribution mechanism 16 functions as a differential mechanism that performs differential operation. In the power transmission system 12, the engine 14 is coupled to the carrier CA via a damper 28 such that power can be transmitted between the engine 14 and the carrier CA. The first motor MG1 is coupled to the sun gear S such that power can be transmitted between the first motor MG1 and the sun gear S. The second motor MG2 is coupled to the ring gear R such that power can be transmitted between the second motor MG2 and the ring gear R. In the power distribution mechanism 16, the carrier CA functions as an input element. The sun gear S functions as a reaction-force element. The ring gear R functions as an output element.

Figure 2:
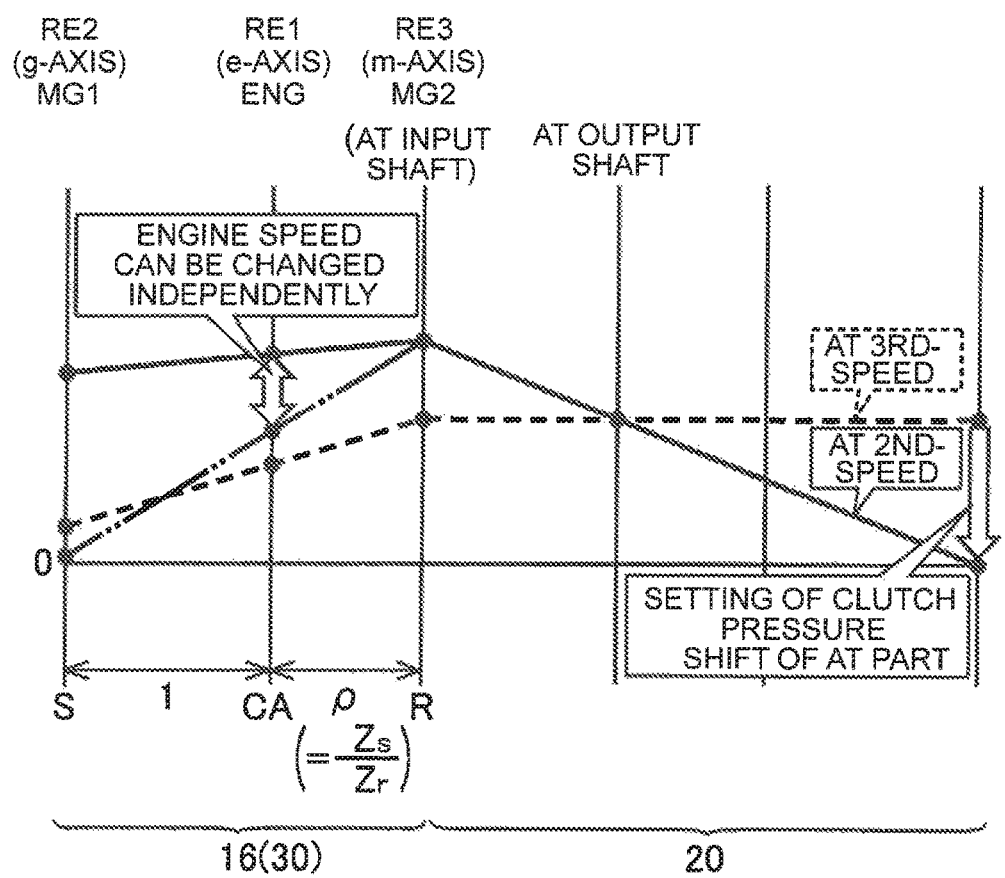
FIG. 2 is a nomographic chart showing one example of relative relationships among rotational speeds of respective rotating elements in a power distribution mechanism, when the vehicle is traveling.

The nomographic chart of FIG. 2 shows relative relationships of the rotational speeds of the respective rotating elements in the power distribution mechanism 16. In the nomographic chart, vertical axis S (g-axis), vertical axis CA (e-axis), and vertical axis R (m-axis) represent the rotational speed of the sun gear S, rotational speed of the carrier CA, and the rotational speed of the ring gear R, respectively. In FIG. 2, the intervals between the vertical axis S, vertical axis CA, and the vertical axis R are set such that, where the interval between the vertical axis S and the vertical axis CA is 1, the interval between the vertical axis CA and the vertical axis R is equal to ρ. Namely, (the gear ratio ρ of the power distribution mechanism 16)=(the number of teeth Zs of the sun gear S)/(the number of teeth Zr of the ring gear R).

In FIG. 2, each line (solid line, broken line, two-dot chain line) indicates the relative speeds of the respective rotating elements in a hybrid traveling mode in which the vehicle is allowed to travel using at least the engine 14 as a drive source. In the hybrid traveling mode, when reaction-force torque as negative torque produced by the first motor MG1 is applied as positive rotation to the sun gear S, against engine torque Te received by the carrier CA, in the power distribution mechanism 16, engine directly-reached torque Td $(=Te/(1+\rho)=-(1/\rho)\times Tg)$ that provides positive torque appears as positive rotation on the ring gear R. Then, according to the required driving force, the total or combined torque of the engine directly-reached torque Td and the MG2 torque Tm is transmitted as driving force in the vehicle forward direction to the drive wheels 18 via the automatic transmission 20. At this time, the first motor MG1 functions as a generator that generates negative torque when it is rotated positively. The electric power Wg generated by the first motor MG1 is charged into the battery 26, or consumed by the second motor MG2, for example. The second motor MG2 delivers MG2 torque Tm, using the whole or a part of the generated electric power Wg, or using electric power from the battery 26 in addition to the generated electric power Wg. When electric power Win consumed by the second motor MG2 is obtained by consuming the whole of the generated electric power Wg, and does not include any electric power from the battery 26, the charge/discharge electric power balance of the battery 26 becomes equal to zero.

Although not illustrated in FIG. 2, in a nomographic chart for the power distribution mechanism 16 in a motor traveling mode, the carrier CA is not rotated (i.e., rotated at zero speed), and the MG2 torque Tm that provides positive torque is applied as positive rotation to the ring gear R. The motor traveling mode is a mode in which the vehicle is allowed to travel using the second motor MG2 as a drive source with the engine 14 stopped. At this time, the first motor MG1 coupled to the sun gear S is placed in a no-load condition and is rotated at idle in a negative direction. Namely, in the motor traveling mode, the engine 14 is not driven, and the engine speed ωe is equal to zero, while the MG2 torque Tm (here, power running torque of positive rotation) is transmitted as driving force in vehicle forward direction to the drive wheels 18 via the automatic transmission 20.

The power transmission system 12 includes the power distribution mechanism 16 having three rotating elements, i.e., the carrier CA as a first rotating element RE1 to which the engine 14 is operatively coupled, the sun gear S as a second rotating element RE2 to which the first motor MG1 as an electric motor for differential operation is operatively coupled, and the ring gear R as a third rotating element RE3 to which the second motor MG2 as a motor for running the vehicle is operatively coupled. In the power transmission system 12, an electric continuously variable transmission 30 (see FIG. 1) as an electric transmission (electric differential mechanism) is constructed in which an operating state of the first motor MG1 is controlled so that a differential status of the power distribution mechanism 16 is controlled. Namely, the electric continuously variable transmission 30 has the power distribution mechanism 16, and the first motor MG1 operatively coupled to the power distribution mechanism 16, and is constructed as an electric continuously variable transmission in which the operating state of the first motor MG1 is controlled so that the differential status of the power distribution mechanism 16 is controlled. The electric continuously variable transmission 30 is configured to operate as an electric continuously variable transmission that changes the speed ratio γ0 (=engine speed ωe/MG2 rotational speed ωm). The electric continuously variable transmission 30 is one example of the continuously variable transmission that transmits the power of the engine 14 toward the drive wheels 18.

Referring back to FIG. 1, the automatic transmission 20 is a mechanical transmission that provides a part of a power transmission path between the electric continuously variable transmission 30 (more specifically, a transmission member 32 as an output rotating member of the electric continuously variable transmission 30), and the drive wheels 18. The transmission member 32 is coupled integrally with the ring gear R. The transmission member 32 is also coupled integrally with a transmission input shaft (AT input shaft) 34 as an input rotating member of the automatic transmission 20. The second motor MG2 is coupled to the transmission member 32 such that power can be transmitted between the second motor MG2 and the transmission member 32. The power transmission system 12 includes the electric continuously variable transmission 30 and the automatic transmission 20 arranged in series. The automatic transmission 20 is a known planetary gear type automatic transmission that has two or more planetary gear units and two or more engagement devices, for example. The automatic transmission 20 performs so-called clutch-to-clutch shifting by engaging and releasing selected ones of the two or more engagement devices (namely, by switching engaged and released states of the engagement devices). Namely, the automatic transmission 20 is a stepwise variable transmission in which a shift is carried out (i.e., the speed ratio is changed) through engagement and release control of the engagement devices, so as to form a selected one of two or more shift positions (gear positions) having different speed ratios (gear ratios) γat (=AT input rotational speed ωi/AT output rotational speed ωo).

The above-mentioned two or more engagement devices are hydraulic friction devices that transmit rotation and torque between the transmission input shaft 34 that receives power from the engine 14 and the second motor MG2, and a transmission output shaft (AT output shaft) 36 that transmits power to the drive wheels 18. The transmission output shaft 36 is an output rotating member of the automatic transmission 20. The torque capacity (clutch torque) of each of the engagement devices is changed by regulating the engaging hydraulic pressure (clutch pressure) by means of a solenoid valve, or the like, in a hydraulic control circuit 38 included in the automatic transmission 20, so that engagement and release of the engagement device are controlled. In this embodiment, the two or more engagement devices will be called "clutches C", for the sake of convenience, but the clutches C include brakes, etc., as well as clutches.

In this connection, the clutch torque of each clutch C is determined by the friction coefficient of a friction material of the clutch C, and the clutch hydraulic pressure with which friction plates are pressed, for example. In order to transmit torque (for example, AT input torque Ti as torque applied to the transmission input shaft 34) between the transmission input shaft 34 and the transmission output shaft 36 without slipping the clutch C, namely, without giving rise to a difference in the rotational speed of the clutch C, clutch torque that provides a clutch transmission torque portion (namely, torque allocated to each of the clutches C) as a portion of the torque which needs to be received and transmitted by each clutch C is needed. It is, however, to be noted that, even when the clutch torque that provides the clutch transmission torque portion for each clutch C is increased, the clutch transmission torque is not increased. Namely, the clutch torque corresponds to the maximum torque that can be transmitted via the clutches C, and the clutch transmission torque corresponds to torque actually transmitted via the clutches C. Accordingly, in a condition where a difference in the rotational speed arises in the clutch C, the clutch torque corresponds to the clutch transmission torque. The clutch torque (or clutch transmission torque) and the clutch hydraulic pressure have a generally proportional relationship, except for a region in which the clutch hydraulic pressure needed for eliminating clearances in a pack of the clutch C is supplied.

FIG. 3 is a skeleton diagram that illustrates one example of the automatic transmission 20. The automatic transmission 20 is constructed generally symmetrically with respect to the axis X of the transmission input shaft 34, and the lower half of the automatic transmission 20 below the axis X is not illustrated in FIG. 3. In FIG. 3, the automatic transmission 20 includes a first planetary gear unit 21a and a second planetary gear unit 21b having rotating elements (sun gears S1, S2, carriers CA1, CA2, and ring gears R1, R2). Each of the rotating elements of the first and second planetary gear units 21a, 21b is coupled to another rotating element, or coupled to the transmission input shaft 34, a case 40 as a non-rotating member, or the transmission output shaft 36, directly or indirectly (or selectively) via a clutch C (clutch C1, C2, or brake B1, B2) or a one-way clutch F1. The automatic transmission 20 is placed in a selected one of four forward gear positions, as indicated in an engagement operation table of FIG. 4, according to the accelerating operation of the driver, the vehicle speed V, etc., through engagement/release control of each of the clutches C. In FIG. 4, "1st" through "4th" indicate the first-speed gear position through fourth-speed gear position as forward gear positions. The engagement operation table of FIG. 4 shows the relationship between each of the above-indicated gear positions and respective operating states of the clutches C. In FIG. 4, "◯" indicates engaged state, and "Δ" indicates engaged state when engine brake is applied, while blank indicates released state. Since the one-way clutch F1 is provided in parallel with the brake B2 that establishes the first-speed gear position "1st", there is no need to engage the brake B2 when the vehicle is started (or accelerated).

Referring back to FIG. 1, the vehicle 10 has the electronic control unit 50 including a control system of the power transmission system 12, for example. FIG. 1 shows an input/output system of the electronic control unit 50, and is also a functional block diagram useful for explaining a principal part of control functions performed by the electronic control unit 50. The electronic control unit 50 includes a so-called microcomputer having CPU, RAM, ROM, input/output interface, etc. The electronic control unit 50 performs various controls of the vehicle 10, by conducting signal processing according to programs stored in advance in the ROM, while utilizing the temporary storage function of the RAM. For example, the electronic control unit 50 performs output control of the engine 14, output control, including regeneration control, of each of the first motor MG1 and the second motor MG2, shift control of the automatic transmission 20, and so forth, and is configured to be divided into sub-units for engine control, motor control, hydraulic control (shift control), etc., as needed.

The electronic control unit 50 is supplied with various actual values based on detection signals detected by various sensors included in the vehicle 10. The sensors include, for example, an engine speed sensor 60, motor speed sensors 62, 64, such as resolvers, vehicle speed sensor 66, accelerator pedal position sensor 68, and a throttle opening sensor 70. The above-mentioned actual values include, for example, an engine speed ωe as the rotational speed (angular velocity) of the engine 14, MG1 rotational speed ωg as the rotational speed (angular velocity) of the first motor MG1, MG2 rotational speed ωm as the rotational speed (angular velocity) of the second motor MG2 corresponding to an AT input rotational speed ωi as the rotational speed (angular velocity) of the transmission input shaft 34, AT output rotational speed ωo as the rotational speed (angular velocity) of the transmission output shaft 36 corresponding to the vehicle speed V, accelerator pedal stroke θacc as the operation amount of the accelerator pedal representing the amount of acceleration requested by the driver, throttle opening θth as the opening of an electronic throttle valve, and so forth. The electronic control unit 50 generates an engine output control command signal Se for output control of the engine 14, motor control command signal Smg for operating the inverter 24 that controls the first motor MG1 and the second motor MG2, hydraulic control command signal Sp for controlling the clutches C associated with shifting of the automatic transmission 20, and so forth. The hydraulic control command signal Sp is a command signal (drive current) for driving each solenoid valve that regulates each clutch pressure supplied to a hydraulic actuator of each of the clutches C, for example. The hydraulic control command signal Sp is generated to the hydraulic control circuit 38. The electronic control unit 50 sets a hydraulic command value corresponding to a value of each clutch pressure supplied to the hydraulic actuator, and generates drive current corresponding to the hydraulic command value.

The electronic control unit 50 includes a hybrid control means or hybrid controller 52, and a shift control means or shift controller 54, so as to implement various controls in the vehicle 10.

The hybrid controller 52 has a function as an engine operation control means or engine operation controller 55 for controlling operation of the engine 14, and a function as a motor operation control means or motor operation controller 56 for controlling operation of the first motor MG1 and the second motor MG2 via the inverter 24. The hybrid controller 52 uses these control functions to perform hybrid drive control, etc. on the engine 14, first motor MG1, and the second motor MG2. More specifically, the hybrid controller 52 calculates required drive torque Tdem (namely, required drive power Pdem at the current vehicle speed V) by applying the accelerator pedal stroke θacc and the vehicle speed V to a predetermined relationship (e.g, driving force map) that is empirically or theoretically obtained in advance and stored. The hybrid controller 52 outputs command signals (engine output control command signal Se and motor control command signal Smg) for controlling the engine 14, first motor MG1, and the second motor MG2, so as to achieve the required drive power Pdem, in view of the engine optimum fuel efficiency point, transmission loss, accessory load, gear ratio γat of the automatic transmission 20, chargeable/dischargeable electric power Win, Wout of the battery 26, and so forth. As a result of the control, the speed ratio γ0 of the electric continuously variable transmission 30 is controlled. The engine output control command signal Se is a power command value of the engine 14 (which will be called "engine power command value Pet"). The motor control command signal Sing is, for example, a command value of generated electric power Wg of the first motor MG1 that delivers reaction-force torque (MG1 torque Tg) of the engine torque Te, or a command value of consumed electric power Win of the second motor MG2 that delivers the MG2 torque Tm.

The shift controller 54 determines whether the automatic transmission 20 should be shifted up or down according to a predetermined relationship (shift map). When the shift controller 54 determines that the automatic transmission 20 should be shifted into a certain gear position, it outputs a hydraulic control command signal Sp for engaging and/or releasing the clutch(es) C associated with the shift of the automatic transmission 20, to the hydraulic control circuit 38, so as to establish the gear position thus determined.

In the power transmission system 12 including the electric continuously variable transmission 30 and the automatic transmission 20 arranged in series, control of the engine speed ωe (see the solid line and two-dot chain line of FIG. 2) can be performed, separately from control of the AT input rotational speed ωi (see the solid line and broken line of FIG. 2) (namely, independently of shift control of the automatic transmission 20), as shown in FIG. 2. In the shift control of the automatic transmission 20, it is possible to control the rate of change of the AT input rotational speed ωi to a target rate of change during shifting of the automatic transmission 20, by setting the cutch pressures of the clutches C associated with a shift in view of the AT input torque Ti, for example. However, it is difficult to control the engine speed ωe at the same time as the shift of the automatic transmission 20, by taking the AT input torque Ti into consideration. While it may be considered to control the engine speed ωe in view of torque of each shaft in the electric continuously variable transmission 30, to which each of the engine 14, first motor MG1, and the second motor MG2 is coupled, the control will be complicated. Also, the first motor MG1 and the second motor MG2 are controlled in terms of the power (generated electric power Wg and consumed electric power Wm), within the range of restriction (e.g., chargeable/dischargeable electric power Win, Wout of the battery 26, or rating of the motor itself) of the power (electric power); therefore, the compatibility is reduced when the automatic transmission 20 is controlled in terms of torque. Meanwhile, it is desirable to appropriately control the rate of change of the engine speed, since it is considered to have a large contribution to the driveability.

Thus, the electronic control unit 50 further includes a hydraulic command value setting unit 58 that sets a hydraulic command value of the clutch C based on the engine power command value Pet, during shifting of the automatic transmission 20, so as to realize control that reduces deterioration of the driveability during shifting of the automatic transmission 20 while the vehicle is traveling with the engine driven. Namely, the electronic control unit 50 controls the clutch pressure of the clutch C during shifting of the automatic transmission 20, based on the engine power Pe, rather than the torque of the engine 14, etc. By setting the clutch pressure based on power, rather than torque, it is possible to balance the whole system (i.e., match the rate of change of the AT input rotational speed ωi and the rate of change of the engine speed ωe as the degrees of progression, for example), without taking account of torque of each shaft in the electric continuously variable transmission 30.

The clutch C to be subjected to the above control is an engagement device on the side on which a shift mainly proceeds, out of the engagement devices associated with the shift of the automatic transmission 20, for example. Generally, on a power-on downshift as a downshift in a driven state, the clutch torque (clutch pressure) of the engagement device on the release side is set so that the AT input rotational speed ωi that can be naturally increased by slipping the engagement device on the release side increases at a target rate of change, so that the downshift proceeds. On a power-on upshift as an upshift in a driven state, the clutch torque (clutch pressure) of the engagement device on the apply side is set so that the AT input rotational speed ωi is reduced at a target rate of change (namely, so that the AT input rotational speed ωi is forced to be reduced), by slipping the engagement device on the apply side, so that the upshift proceeds. It follows that the clutch C to be controlled is the engagement device on the release side on the power-on downshift, and the clutch C to be controlled is the engagement device on the apply side on the power-on upshift. From the standpoint of the engagement device on the side on which a shift mainly proceeds, the clutch C to be controlled is the engagement device on the release side on a power-off upshift, and the clutch C to be controlled is the engagement device on the apply side on a power-off downshift. However, since the engine power Pe is reduced in a power-off state, it suffices to assume at least the power-on state, as a traveling state that is to be controlled.

When the shift controller 54 determines that the automatic transmission 20 is in the middle of shifting or changing the speed ratio, the hydraulic command value setting unit 58 sets a hydraulic command value of the clutch C to be controlled as described above. A method of setting the hydraulic command value of the clutch C will be described.

The hydraulic command value setting unit 58 calculates clutch power Pc of the clutch C, so that the relationship of the following equation (1) is satisfied, and sets a clutch pressure (hydraulic command value) of the clutch C which realizes the clutch power Pc, based on the clutch power Pc. In the following equation (1), the clutch power Pc is calculated by subtracting power Pi (which will be called "shift progression power Pi") required for shift progression in the electric continuously variable transmission 30 and the automatic transmission 20 during shifting of the automatic transmission 20, from the engine power command value Pct. Namely, the clutch power Pc is power consumed by the clutch C during shifting of the automatic transmission 20. The clutch power Pe is the product of the clutch torque determined by the clutch pressure of the clutch C and the differential rotational speed of the clutch C. The shift progression power Pi is power needed when the transmission input shaft 34, engine 14, etc. change the rotational speeds during shifting, and is commensurate with the rate of change of the rotational energy in the electric continuously variable transmission 30 and the automatic transmission 20. The shift progression power Pi is one example of the first power. The clutch power Pc is one example of the second power. Thus, the hydraulic command value setting unit 58 sets the hydraulic command value of the clutch C based on the engine power command value Pet, during shifting of the automatic transmission 20. Also, the hydraulic command value setting unit 58 sets the hydraulic command value of the clutch C based on the shift progression power Pi, during shifting of the automatic transmission 20.

$$Pc = Pet - Pi \quad (1)$$

The hydraulic command value setting unit 58 calculates the shift progression power Pi, by dividing a rotational energy difference ΔE (=Eaft−Ebfr) in the electric continuously variable transmission 30 and the automatic transmission 20, before and after a shift of the automatic transmission 20, by a target shift time Tina of the automatic transmission 20 as a target inertia-phase time determined in advance for each shift type (e.g., 2-3 upshift, 3-2 downshift) of the automatic transmission 20. The hydraulic command value setting unit 58 calculates rotational energy E, according to the following equation (3). Eaft denotes the rotational energy after the shift, and Ebfr denotes the rotational energy before the shift. Im denotes the inertia in the transmission input shaft 34 (namely, the second motor MG2+the automatic transmission 20), which is determined for each gear position of the automatic transmission 20 (which depends on the engagement state of the clutch C in the automatic transmission 20). Ie denotes the inertia of the engine 14. Ig denotes the inertia of the first motor MG1. The MG2 rotational speeds ωm before and after the shift are calculated by multiplying the AT output rotational speed ωo by the gear ratios in the gear positions of the automatic transmission 20 before and after the shift. Target engine speeds ωet before and after the shift are set according to the vehicle speed V and the gear position of the automatic transmission 20. The MG1 rotational speeds ωg before and after the shift are calculated based on the following equation (4) determined in advance based on the relative relationship of the rotational speeds of the three rotating elements in the power distribution mechanism 16.

$$Pi=(Eaft-Ebfr)/Tina \quad (2)$$

$$E=(Im \times \omega m^2 + Ie \times \omega et^2 + Ig \times \omega g^2)/2 \quad (3)$$

$$\omega g = (1+\rho)/\rho \times \omega e - (1/\rho) \times \omega m \quad (4)$$

The hydraulic command value setting unit 58 sets the hydraulic command value of the clutch C according to the clutch power Pc calculated using the above equations (1)-(4). The hydraulic command value setting unit 58 calculates the clutch torque by dividing the clutch power Pc by a predetermined differential rotational speed of the clutch C during progression of a shift of the automatic transmission 20, and sets the hydraulic command value of the clutch C with which the calculated clutch torque is obtained. Alternatively, the hydraulic command value setting unit 58 applies the clutch power Pc, to a map determined in advance so that the hydraulic command value of the clutch C becomes higher as the clutch power Pc is larger, for example, so as to set the hydraulic command value of the clutch C. Thus, the hydraulic command value setting unit 58 sets the hydraulic command value of the clutch C to a higher value as the clutch power Pc is larger.

As is apparent from the above equation (1), the clutch power Pc is larger as the engine power command value Pet is larger. Accordingly, the hydraulic command value setting unit 58 set the hydraulic command value of the clutch C to a higher value as the engine power command value Pet is larger. As is apparent from the above equation (1), the clutch power Pc is larger as the shift progression power Pi is smaller. Accordingly, the hydraulic command value setting unit 58 sets the hydraulic command value of the clutch C to a higher value as the shift progression power Pi is smaller.

As is apparent from the above equations (2)-(4), the shift progression power Pi can be estimated based on the gear ratios in the gear positions of the automatic transmission 20 before and after the shift, and the AT output rotational speed ωo. The hydraulic command value setting unit 58 sets the shift progression power Pi to a larger value as the AT output rotational speed ωo is larger, and sets the shift progression power Pi to a larger value as a difference between the gear ratios of the gear positions before and after the shift of the automatic transmission 20 is larger. Thus, a given value according to the gear positions before and after the shift of the automatic transmission 20 and the AT output rotational speed ωo may be determined in advance as the shift progression power Pi.

As described above, the clutch power Pc can be set according to the engine power command value Pet, and the shift progression power Pi (namely, the gear positions before and after the shift of the automatic transmission 20 and the AT output rotational speed ωo). Accordingly, in setting of the hydraulic command value of the clutch C according to the clutch power Pc, a given value according to the engine power command value Pet and the shift progression power Pi (the gear positions before and after the shift of the automatic transmission 20, the AT output rotational speed ωo) may be determined in advance as the hydraulic command value of the clutch C. For example, the hydraulic command value setting unit 58 sets the hydraulic command value of the clutch C using a predetermined map, so that the hydraulic command value of the clutch C is higher as the engine power command value Pet is larger, and the hydraulic command value of the clutch C is higher as the shift progression power Pi is smaller.

Since the power transmission system 12 includes the electric continuously variable transmission 30, the relationship of powers during shifting of the automatic transmission is expressed by the following equation (5). The battery power Pbat is charge/discharge power (i.e., electric power balance) of the battery 26, and is a difference between the generated electric power Wg and the consumed electric power Wm. The battery power Pbat depends on restrictions of electric power, such as chargeable/dischargeable electric power Win, Wout, of the battery 26, for example. If the battery power Pbat is not used (namely, the electric power balance is assumed to be zero), during shifting of the automatic transmission 20, more stable hydraulic control can be carried out, which is advantageous in terms of the system. Namely, if the concept of the battery power Pbat is excluded, the electric continuously variable transmission 30 and the automatic transmission 20 can achieve a shift that does not depend on the electric power balance (or a shift that aims at making the power balance zero, from a different point of view). Therefore, in order to achieve high shift qualities (in terms of shock, time) with high reproducibility, the hydraulic command value setting unit 58 sets the hydraulic command value of the clutch C so as to satisfy the relationship as represented by the above equation (1), which excludes the battery power Pbat. Namely, the hydraulic command value setting unit 58 sets the hydraulic command value of the clutch C without taking account of the battery power Pbat of the battery 26.

$$Pet+Pbat=Pc+Pi \quad (5)$$

Figure 5:
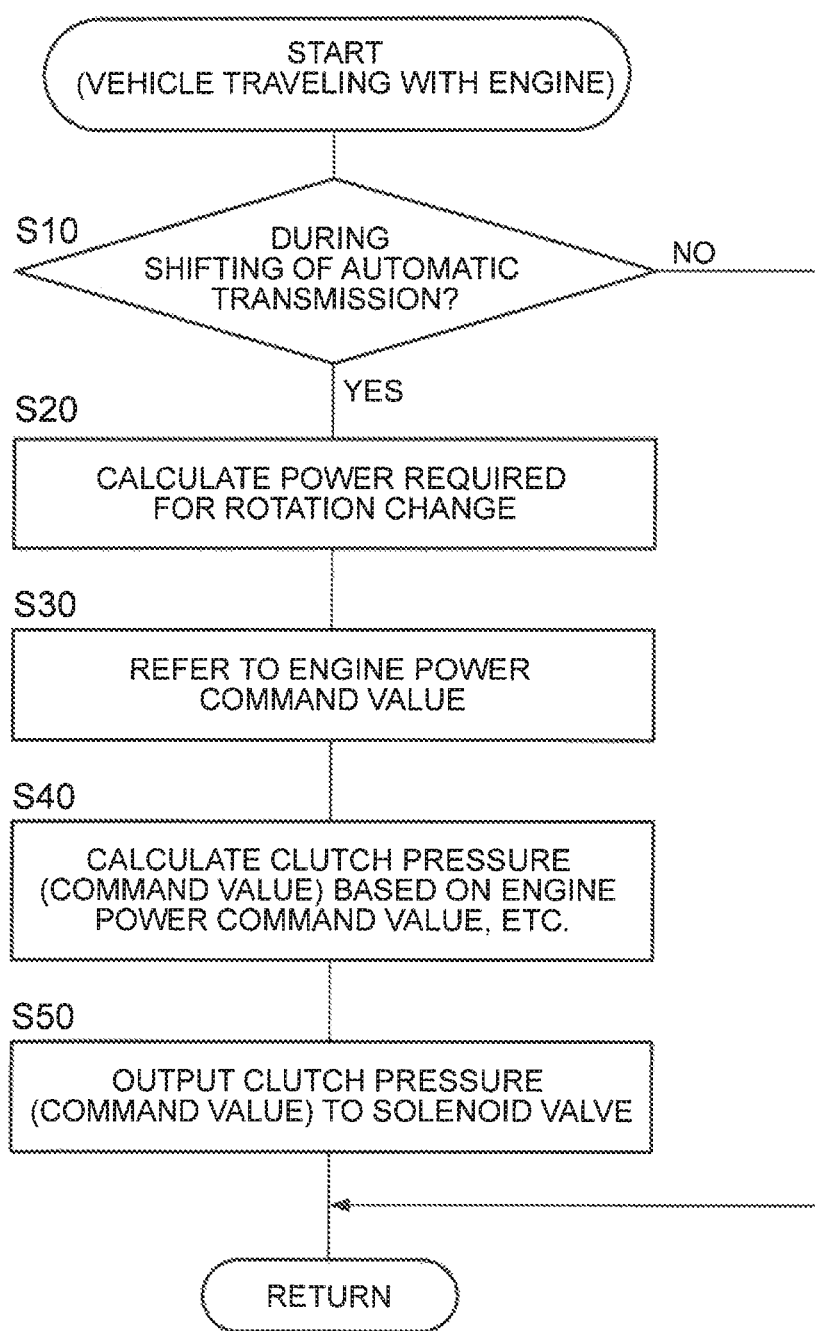
FIG. 5 is a flowchart illustrating a principal part of control operation of an electronic control unit, namely, control operation for reducing deterioration of the driveability due to a gap between the rate of change of the engine speed and the degree of shift progression of the automatic transmission, in the power transmission system of the vehicle including an electric continuously variable transmission and the automatic transmission arranged in series.

FIG. 5 is a flowchart illustrating a principal part of control operation of the electronic control unit 50, namely, control operation for reducing deterioration of the driveability due to a gap between the rate of change of the engine speed ωe and the degree of shift progression of the automatic transmission 20 (e.g., the rate of change of the AT input rotational speed ωi), in the power transmission system 12 including the electric continuously variable transmission 30 and the automatic transmission 20 arranged in series. The control routine in the flowchart of FIG. 5 is repeatedly executed while the vehicle is traveling with the engine being driven.

In FIG. 5, initially, in step S10 corresponding to a function of the shift controller 54, it is determined whether the automatic transmission 20 is in the middle of shifting. If a negative decision (NO) is made in step S10, this cycle of the routine ends. If an affirmative decision (YES) is made in step S10, the shift progression power Pi as power required for change of the rotational speeds is calculated using the above equation (2) or predetermined values (map), for example, in step S20 corresponding to a function of the hydraulic command value setting unit 58. Then, in step S30 corresponding to a function of the hydraulic command value setting unit 58, the engine output control command signal Se (engine power command value Pet) generated by the hybrid controller 52 is referred to (obtained). Then, in step S40 corresponding to a function of the hydraulic command value setting unit 58, the hydraulic command value of the clutch C is set based on the engine power command value Pet and the shift progression power Pi, using the above equation (1) or predetermined value (map), for example. Then, in step S50 corresponding to a function of the shift controller 54, the hydraulic command value (namely, drive current according to the hydraulic command value) of the clutch C is delivered to the hydraulic control circuit 38 (namely, a solenoid valve that regulates the clutch pressure of the clutch C).

As described above, according to this embodiment, during shifting of the automatic transmission 20, the hydraulic command value of the clutch C is set to a higher value as the engine power command value Pet is larger; therefore, a shift in the electric continuously variable transmission 30 and the automatic transmission 20 proceeds in accordance with the engine power Pe as the product of the engine speed ωe and the engine torque Te, rather than the torque of the engine 14, etc. Accordingly, in the power transmission system 12 having the electric continuously variable transmission 30 and the automatic transmission 20 arranged in series, the controllability of the automatic transmission 20 during shifting is improved, and deterioration of the driveability due to a gap between the rate of change of the engine speed ωe and the degree of shift progression of the automatic transmission 20 can be reduced.

Also, according to this embodiment, during shifting of the automatic transmission 20, the hydraulic command value of the clutch C is set based on the shift progression power Pi, and the hydraulic command value of the clutch C is set to a higher value as the shift progression power Pi is smaller; therefore, the hydraulic command value of the clutch C can be appropriately set according to the shift progression power Pi. It is thus possible to reduce deterioration of the driveability due to the gap between the rate of change of the engine speed ωe and the degree of shift progression of the automatic transmission 20.

Also, according to this embodiment, the shift progression power Pi is calculated by dividing the rotational energy difference ΔE (=Eaft−Ebfr) in the electric continuously variable transmission 30 and the automatic transmission 20, before and after a shift of the automatic transmission 20, by the target shift time Tina of the automatic transmission 20. Thus, the hydraulic command value of the clutch C is appropriately set based on the shift progression power Pi.

Also, according to this embodiment, the shift progression power Pi is set to a larger value as the AT output rotational speed ωo is larger, and is set to a larger value as a difference between the gear ratios of the gear positions established before and after a shift of the automatic transmission 20 is larger. Accordingly, the hydraulic command value of the clutch C is appropriately set based on the shift progression power Pi.

Also, according to this embodiment, the hydraulic command value of the clutch C is set based on the clutch power Pc calculated by subtracting the shift progression power Pi from the engine power command value Pet, and the hydraulic command value of the clutch C is set to a higher value as the calculated clutch power Pc is larger. Accordingly, the hydraulic command value of the clutch C is appropriately set according to the shift progression power Pi. It is thus possible to reduce deterioration of the driveability due to the gap between the rate of change of the engine speed ωe and the degree of shift progression of the automatic transmission 20.

Also, according to this embodiment, the hydraulic command value of the clutch C is set without taking account of the battery power Pbat of the battery 26, thus making it possible to realize a shift in a condition where the battery 26 is not charged nor discharges power (namely, in a condition Where the electric power balance of the battery 26 is zero). As a result, shift control can be implemented with high reproducibility, regardless of restrictions of charge/discharge power of the battery 26 imposed by the temperature, charging capacity, etc. of the battery 26. Namely, shift control can be implemented with high reproducibility, by deliberately excluding the concept of the battery power Pbat of the battery 26 when the hydraulic command value of the clutch C is set.

While one embodiment has been described in detail based on the drawings, this disclosure may also be applied in other forms.

Figure 6:
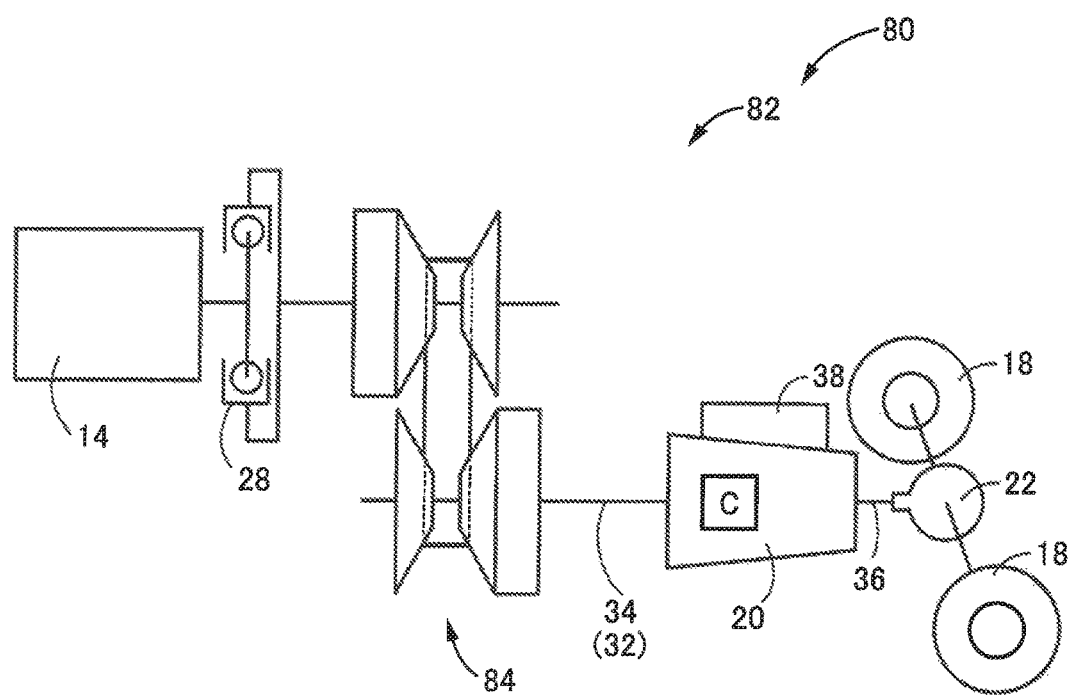
FIG. 6 is a view schematically showing the configuration of a power transmission system included in a vehicle according to another embodiment.

In the illustrated embodiment, the electric continuously variable transmission 30 as an electric continuously variable transmission has been illustrated as an example of the continuously variable transmission that transmits power of the engine 14 toward the drive wheels 18. However, the disclosure is not limited to the use of this type of speed change unit. Another embodiment will be described with reference to FIG. 6. The continuously variable transmission may be a known belt-and-pulley type continuously variable transmission 84 as a mechanical continuously variable transmission, which provides a part of a vehicular power transmission system 82 included in a vehicle 80 as shown in FIG. 6, for example. In FIG. 6, the vehicular power transmission system 82 includes the continuously variable transmission 84 and the automatic transmission 20 arranged in series. In sum, the present disclosure may be applied no matter whether the continuously variable transmission is an electric continuously variable transmission or a mechanical continuously variable transmission. When the continuously variable transmission is the electric continuously variable transmission, it is possible to appropriately change the speed ratio while taking account of the electric power balance, according to the disclosure.

Also, in the illustrated embodiment, the automatic transmission 20 in the form of the planetary gear type automatic transmission has been illustrated as one example of the stepwise variable transmission that provides a part of the power transmission path between the electric continuously variable transmission 30 and the drive wheels 18. However, the disclosure is not limited to the use of this type of transmission. For example, the stepwise variable transmission may be a synchromesh parallel two-axis type automatic transmission, which may be a dual clutch transmission (DCT), or an auxiliary transmission that switches between a high gear position and a low gear position. The dual clutch transmission has input shafts on two systems, such that a clutch is coupled to an input shaft of each system, and the two systems provide even-numbered gear positions and odd-numbered gear positions, respectively In the illustrated embodiment, the hydraulic command value of the clutch C is set without taking account of the battery power Pbat of the battery 26. However, the hydraulic command value of the clutch C may be set using the above-indicated equation (5) in which the battery power Pbat is added. In this case, during shifting of the automatic transmission 20, the electric power balance can be controlled (into a condition where the balance is not equal to zero, for example) so as to depend on restrictions of electric power, such as chargeable/dischargeable power Win, Wout of the battery 26.

Also, in the illustrated embodiment, the power distribution mechanism 16 is in the form of a differential mechanism having three rotating elements. However, the disclosure is not limited to this arrangement. For example, the disclosure may be applied even when the power distribution mechanism 16 is a differential mechanism having two or more planetary gear units coupled to each other to provide four or more rotating elements. The power distribution mechanism 16 may also be a double-pinion type planetary gear unit. The power distribution mechanism 16 may also be a differential gear unit in which a pinion that is rotated or driven by the engine 14, and a pair of bevel gears that mesh with the pinion are operatively coupled to the first motor MG1 and the transmission member 32.

It is to be understood that the above-described embodiments are mere examples, and that this disclosure may be embodied with various changes or improvements, based on the knowledge of those skilled in the art.

What is claimed is:

1. A vehicle comprising:
   an engine;
   drive wheels;
   a power transmission system including a continuously variable transmission and a stepwise variable transmission,
   the continuously variable transmission being configured to transmit power of the engine toward the drive wheels,
   the stepwise variable transmission providing a part of a power transmission path between the continuously variable transmission and the drive wheels, the stepwise variable transmission including a hydraulic engagement device, a shift of the stepwise variable transmission being performed through operation of the engagement device; and
   an electronic control unit configured to set a hydraulic command value of the engagement device to a value that increases in correspondence with an increase in a power command value of the engine, during shifting of the stepwise variable transmission.

2. The vehicle according to claim 1, wherein
   the electronic control unit is configured to set the hydraulic command value of the engagement device, based on a first power required for shift progression in the continuously variable transmission and the stepwise variable transmission, during shifting of the stepwise variable transmission; and
   the electronic control unit is configured to set the hydraulic command value of the engagement device to a value that increases in correspondence with a decrease in the first power.

3. The vehicle according to claim 2, wherein
   the electronic control unit is configured to calculate the first power required for the shift progression, by dividing a rotational energy difference in the continuously variable transmission and the stepwise variable transmission, before and after the shift of the stepwise variable transmission, by a target shift time of the stepwise variable transmission.

4. The vehicle according to claim 2, wherein
   the electronic control unit is configured to set the first power to a value that increases in correspondence with an increase in a rotational speed of an output rotating member of the stepwise variable transmission; and
   the electronic control unit is configured to set the first power to a value that increases in correspondence with an increase in a difference between gear ratios of gear positions of the stepwise variable transmission before and after the shift of the stepwise variable transmission.

5. The vehicle according to claim 2, wherein
   the electronic control unit is configured to set the hydraulic command value of the engagement device, based on a second power calculated by subtracting the first power from a power command value of the engine; and
   the electronic control unit is configured to set the hydraulic command value of the engagement device to a value that increases in correspondence with an increase in the second power.

6. The vehicle according to claim 1, wherein
   the continuously variable transmission includes a differential mechanism and a first motor,
   the differential mechanism is coupled to the engine such that power is transmitted between the engine and the differential mechanism,
   the first motor is coupled to the differential mechanism such that power is transmitted between the differential mechanism and the first motor;
   the continuously variable transmission is an electric continuously variable transmission in which a differential state of the differential mechanism is controlled by controlling an operating state of the first motor; and
   the power transmission system further includes a second motor coupled to an output rotating member of the electric continuously variable transmission such that power is transmitted between the second motor and the output rotating member.

7. The vehicle according to claim 6, wherein
   the power transmission system further includes a power storage device that supplies and receives electric power to and from each of the first motor and the second motor; and
   the electronic control unit is configured to set the hydraulic command value of the engagement device without taking account of charge and discharge power of the power storage device.

8. A control method of a vehicle,
   the vehicle including an engine, drive wheels, a power transmission system and an electronic control unit,
   the power transmission system including a continuously variable transmission and a stepwise variable transmission, the continuously variable transmission being configured to transmit power of the engine toward the drive wheels, the stepwise variable transmission providing a part of a power transmission path between the continuously variable transmission and the drive wheels, the stepwise variable transmission including a hydraulic engagement device, and a shift of the stepwise variable transmission being performed through operation of the engagement device,
   the control method comprising:
   setting, by the electronic control unit, a hydraulic command value of the engagement device to a value that increases in correspondence with an increase in a power command value of the engine during shifting of the stepwise variable transmission.

* * * * *